US009319293B2

(12) United States Patent
Sodhi et al.

(10) Patent No.: US 9,319,293 B2
(45) Date of Patent: Apr. 19, 2016

(54) METHODS AND APPARATUSES FOR NETWORK FLOW ANALYSIS AND CONTROL

(71) Applicant: Calix, Inc., Petaluma, CA (US)

(72) Inventors: Ari Sodhi, Markham (CA); Henning Els, Petaluma, CA (US)

(73) Assignee: Calix, Inc., Petaluma, CA (US)

( * ) Notice: Subject to any disclaimer, the term of this patent is extended or adjusted under 35 U.S.C. 154(b) by 127 days.

(21) Appl. No.: 13/955,864

(22) Filed: Jul. 31, 2013

(65) Prior Publication Data

US 2015/0036533 A1  Feb. 5, 2015

(51) Int. Cl.
*H04L 12/26* (2006.01)
*H04L 12/24* (2006.01)

(52) U.S. Cl.
CPC ............ *H04L 43/0894* (2013.01); *H04L 41/12* (2013.01); *H04L 43/0829* (2013.01)

(58) Field of Classification Search
None
See application file for complete search history.

(56) References Cited

U.S. PATENT DOCUMENTS

| | | | |
|---|---|---|---|
| 5,500,899 A | 3/1996 | Snow | |
| 6,389,468 B1 | 5/2002 | Muller et al. | |
| 6,567,861 B1 | 5/2003 | Kasichainula et al. | |
| 6,681,232 B1 * | 1/2004 | Sistanizadeh et al. | |
| 6,957,269 B2 | 10/2005 | Williams et al. | |
| 7,065,779 B1 | 6/2006 | Crocker et al. | |
| 7,711,844 B2 | 5/2010 | Schuehler et al. | |
| 7,725,919 B1 | 5/2010 | Thiagarajan et al. | |
| 7,817,549 B1 | 10/2010 | Kasralikar et al. | |
| 7,869,428 B2 | 1/2011 | Shake et al. | |
| 8,005,012 B1 | 8/2011 | Aybay et al. | |
| 8,027,305 B1 | 9/2011 | Rogers et al. | |
| 8,046,479 B2 | 10/2011 | Einarsson et al. | |
| 8,085,775 B1 | 12/2011 | Pappu et al. | |
| 8,238,241 B2 | 8/2012 | Samuels et al. | |
| 8,310,934 B2 | 11/2012 | Hou et al. | |
| 8,339,954 B2 | 12/2012 | Dahod | |
| 8,718,131 B2 | 5/2014 | Park et al. | |
| 8,850,590 B2 | 9/2014 | Kellerman | |
| 8,867,529 B2 | 10/2014 | Pearce | |
| 2003/0188252 A1 | 10/2003 | Kim et al. | |
| 2003/0198189 A1 | 10/2003 | Roberts et al. | |
| 2004/0030745 A1 | 2/2004 | Boucher et al. | |
| 2004/0141530 A1 | 7/2004 | Spio | |

(Continued)

OTHER PUBLICATIONS

Baruch, Z., et al., "Embedded System for Network Flow Identification", Automation, Quality and Testing, Robotics, 2006 IEEE International Conference on , vol. 1, (May 2006), 426,429, 25-28.

(Continued)

*Primary Examiner* — Awet Haile
*Assistant Examiner* — Kent Krueger
(74) *Attorney, Agent, or Firm* — Schwegman Lundberg & Woessner, P.A.

(57) ABSTRACT

Techniques for network packet flow analysis and control are described herein. One example method may include obtaining network topology information corresponding to a plurality of nodes of an access network, receiving communication monitoring messages from two or more of the plurality of nodes, wherein the communication monitoring messages include communication information corresponding to a plurality of communication layers, and determining information loss statistics associated with the plurality of nodes based on the communication monitoring messages and the network topology information.

20 Claims, 7 Drawing Sheets

(56) References Cited

U.S. PATENT DOCUMENTS

| | | |
|---|---|---|
| 2005/0094726 A1 | 5/2005 | Park |
| 2007/0006293 A1 | 1/2007 | Balakrishnan et al. |
| 2007/0121615 A1 | 5/2007 | Weill et al. |
| 2007/0220251 A1 | 9/2007 | Rosenberg et al. |
| 2008/0013542 A1 | 1/2008 | Youm et al. |
| 2008/0056153 A1 | 3/2008 | Liu |
| 2008/0201733 A1 | 8/2008 | Ertugrul et al. |
| 2009/0022134 A1 | 1/2009 | Chun et al. |
| 2009/0119722 A1 | 5/2009 | Versteeg et al. |
| 2009/0241170 A1 | 9/2009 | Kumar et al. |
| 2009/0287807 A1 | 11/2009 | Sueyoshi |
| 2010/0043068 A1 | 2/2010 | Varadhan et al. |
| 2010/0088756 A1 | 4/2010 | Balakrishnan et al. |
| 2010/0103837 A1 | 4/2010 | Jungck et al. |
| 2010/0138920 A1 | 6/2010 | Kim et al. |
| 2011/0022721 A1 | 1/2011 | Diab et al. |
| 2011/0107379 A1 | 5/2011 | Lajoie et al. |
| 2011/0110382 A1 | 5/2011 | Jabr et al. |
| 2011/0113218 A1 | 5/2011 | Lee et al. |
| 2011/0158146 A1 | 6/2011 | Poola et al. |
| 2011/0216774 A1 | 9/2011 | Nevil et al. |
| 2011/0255408 A1 | 10/2011 | Aybay et al. |
| 2011/0295983 A1 | 12/2011 | Medved et al. |
| 2011/0317557 A1 | 12/2011 | Siddam et al. |
| 2012/0014282 A1 | 1/2012 | Pappu et al. |
| 2012/0243871 A1 | 9/2012 | Huang et al. |
| 2012/0317276 A1 | 12/2012 | Muniraju |
| 2013/0024901 A1 | 1/2013 | Sharif-Ahmadi et al. |
| 2014/0056182 A1 | 2/2014 | Chai |
| 2014/0269403 A1 * | 9/2014 | Anghel et al. ............... 370/253 |
| 2015/0016247 A1 | 1/2015 | Hayes et al. |
| 2015/0085678 A1 | 3/2015 | Dimond et al. |

OTHER PUBLICATIONS

"U.S. Appl. No. 14/034,282, Response filed May 5, 2015 to Restriction Requirement mailed Mar. 5, 2015", 8 pgs.

"U.S. Appl. No. 14/034,282, Restriction Requirement mailed Mar. 5, 2015", 7 pgs.

"U.S. Appl. No. 14/034,282, Non Final Office Action mailed Jun. 1, 2015", 22 pgs.

"U.S. Appl. No. 13/941,678, Non Final Office Action mailed Aug. 28, 2015", 25 pgs.

"U.S. Appl. No. 14/034,282, Notice of Allowance mailed Oct. 13, 2015", 7 pgs.

"U.S. Appl. No. 14/034,282, Response filed Sep. 1, 2015 to Non Final Office Action mailed Jun. 1, 2015", 9 pgs.

* cited by examiner

METHODS AND APPARATUSES FOR NETWORK FLOW ANALYSIS AND CONTROL

TECHNICAL FIELD

This disclosure relates generally to network communications and in particular to methods and apparatuses for network flow analysis and control.

BACKGROUND

Network providers currently face the challenge of maintaining the integrity of numerous communication flows across an access network, even where the network conditions are less than ideal. To meet this challenge, the network providers must determine locations of the nodes (e.g. switches, network elements, etc.) in the network that are causing the access network to behave in a sub-optimal fashion and remedy the situation, for example, by rerouting or dropping packets.

Locating the problem nodes often involves obtaining and analyzing network traffic information associated with the nodes of a network. Currently, however, this information is often obtained from a single network device, such as a router, that is located at the interface of a core network (e.g. the Internet) and the access network, and typically involves flow information associated with a single communication layer of the Open Systems Interconnection (OSI) model. For example, in some legacy access networks, a router obtains and analyzes Internet Protocol information (Layer 3 information) before reporting the status of packet flows to the network provider. Such methods for flow analysis, however, are limited in the amount of information relied upon for the traffic reports and overall flow management. Thus, methods and apparatuses for improved network flow analysis are needed.

SUMMARY

The present disclosure presents methods and apparatuses for network packet flow analysis and control. In one example, this disclosure is directed to a method of packet flow control, which includes obtaining network topology information corresponding to a plurality of nodes of a network, receiving communication monitoring messages from two or more of the plurality of nodes, wherein the communication monitoring messages include communication information corresponding to a plurality of communication layers, and determining information loss statistics associated with the plurality of nodes based on the communication monitoring messages and the network topology information.

Furthermore, the present disclosure presents an example apparatus for packet flow analysis and control in a network, which includes one or more components for performing the acts of: obtaining network topology information corresponding to a plurality of nodes of a network, receiving communication monitoring messages from at least two of the plurality of nodes, wherein the communication monitoring messages include communication information corresponding to a plurality of communication layers, and determining information loss statistics associated with the plurality of nodes based on the communication monitoring messages and the network topology information.

In addition, the present disclosure presents at least one machine readable medium comprising a plurality of instructions that in response to being executed on a computing device, cause the computing device to perform the acts of: obtaining network topology information corresponding to a plurality of nodes of a network, receiving communication monitoring messages from at least two of the plurality of nodes, wherein the communication monitoring messages include communication information corresponding to a plurality of communication layers, and determining information loss statistics associated with the plurality of nodes based on the communication monitoring messages and the network topology information.

These and other aspects of the invention will become more fully understood upon a review of the detailed description, which follows.

DETAILED DESCRIPTION

The present disclosure presents methods and apparatuses for improved flow control in access networks based on multi-layer packet flow information received from disparate network nodes, e.g., switches, access points, network processing clusters, residential gateways, optical line terminals, optical network units, or other network elements. This packet flow information may be received via communication monitoring messages from each of the network nodes and processed to convey the relative health of the network or a network flow to a user or network provider or network device capable of rerouting flow packets. For example, the multi-layer packet flow information may comprise information related to a plurality of communication layers of the Open Systems Interconnection (OSI) model. In some examples, for instance, one or more nodes may transmit packet flow information associated with layer 1 ("L1"), layer 2 ("L2"), layer 3 ("L3"), or layer 7 ("L7") to a flow control manager, which may combine and process the multi-layer packet flow information to indicate where in the network, e.g., which node, and at which layer traffic is dropped or discarded. As a result, packets may be rerouted around problematic nodes or discarded to allow higher priority packets to be passed through. Alternatively or additionally, the packet flow information may be displayed to a user or network provider on a flow-by-flow or application-by-application basis at each node (or interface), for example, in a color-coded system where, in some examples, green represents a healthy packet flow, yellow represents an intermediate packet flow health, and red represents a poor packet flow health where one or more packets are being dropped or the packet flow is being otherwise altered.

In some examples, the methods and apparatuses described herein will use network topology information (e.g. the interconnection and arrangement of nodes in the network) in combination with the multi-layer packet flow information to determine the health and general direction of flow for an application or service. Specifically, the flow control manager receives communication monitoring messages from a plurality of nodes in the network per interface and determines the packet loss in and out of the respective interfaces.

This information can be expressed in several ways—for example, as a percentage of dropped packets with a particular priority; as a percentage of packets dropped while traversing a node or interface; and/or displayed next to nodes or other points in the network as a relative indicator of how many packets are dropped for the packet flow. Using this wealth of information about the packet flows traversing the access network, the flow control manager (or user or network provider) may reroute packets, drop packets of a particular packet flow, or otherwise alter network behavior to improve network conditions based on the information.

Figure 1:
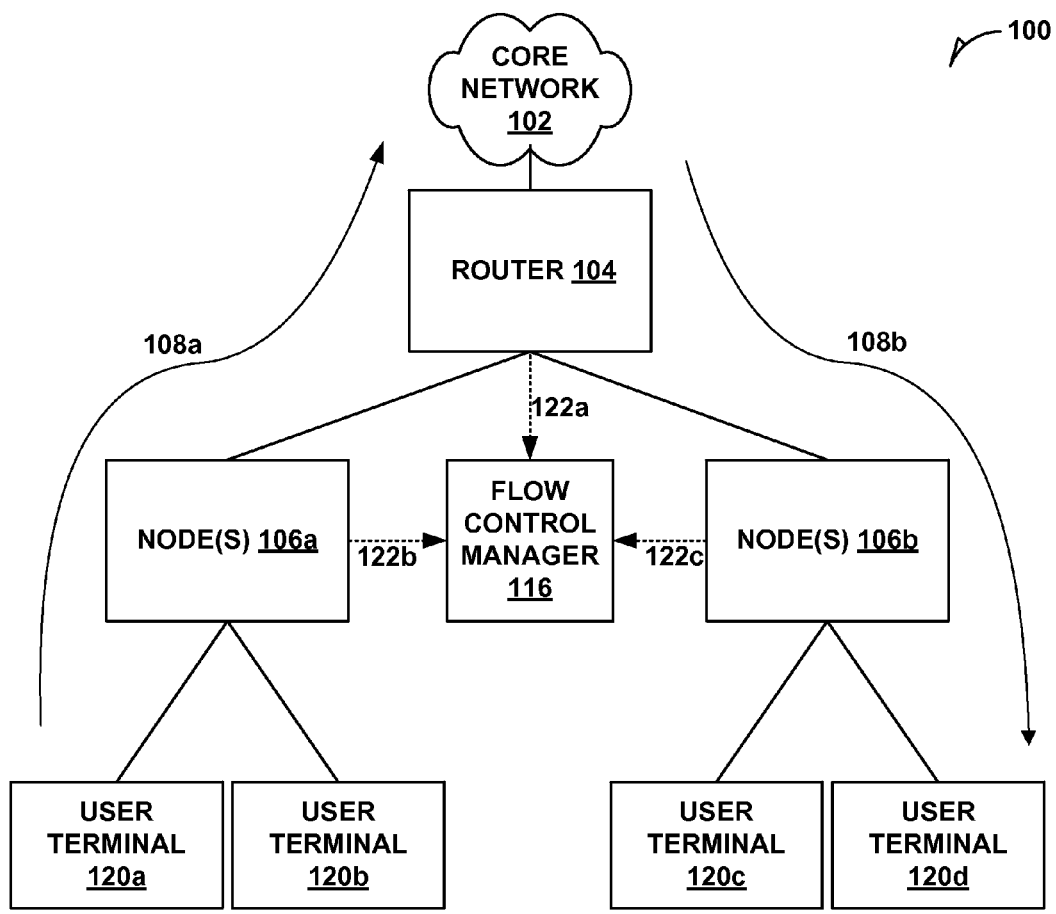
FIG. 1 is a schematic diagram illustrating an example access network for improved flow control as described in the present disclosure.

FIG. 1 illustrates an example access network 100 for improved packet flow control according to the present disclosure. In an aspect, access network 100 may provide communication services (e.g. Internet or telephonic services) to one or more user terminals 120 (including user terminals 120a, 120b, 120c, and 120d, collectively user terminals 120) serviced by the access network 100 via one or more nodes 106 (here, including nodes 106a and 106b). The communication services provided by the access network 100 may include one or more upstream packet flows 108a and/or one or more downstream packet flows 108b (collectively, packet flows 108) carrying one or more packets between a user terminal 120 and a core network 102. In some examples, these one or more packet flows 108 may carry data associated with one or more applications running on a user terminal 120 and/or may include control data associated with the packet flows 108. Furthermore, packet flows 108 may have corresponding communication layer information associated with one or more OSI model communication layers. For example, packet flow 108 may have associated layer information for layer 1 to layer 7, including physical layer information (L1), data link layer information (L2), network layer information (L3), transport layer information (L4), session layer information (L5), presentation layer information (L6), and/or application layer information (L7). In an aspect, the one or more nodes 106 and/or router 104 may periodically transmit one or more communication monitoring messages 122 (including communication monitoring messages 122a, 122b, and 122c) to flow control manager 116.

These communication monitoring messages may include layer-specific packet flow information corresponding to packets of one or more packet flows traversing the node(s) 106 and/or router 104. For example, L1 packet flow information included in the communication monitoring messages 122 may include link information, one or more event alarms, and/or one or more port statistics associated with a node 106 or a particular network interface. Furthermore, this link information may include one or more of an alarm, burstable bandwidth information, a Peak Information Rate (PIR), a Committed Information Rate (CIR), Committed Data Rate (CDR), or an Excess Information Rate (EIR).

In some examples, L2 packet flow information included in the communication monitoring messages 122 may include Remote Network Monitoring (RMON) statistics associated with a node 106. Furthermore, the L2 packet information may include Switched Network Monitoring (SMON) statistics. Additionally, L3 and/or L7 information may include information associated with one or more traffic analyzer reports (e.g. Netflow reports) corresponding to Internet Protocol (IP) or application traffic of one or more packet flows. By receiving layer-specific packet flow information, each node 106 can inform the packet flow manager 116 of the layer- and application-specific status or health of packet flows at the physical level, interface level, service level, and application level to provide a network-wide snapshot of individual interface packet flow health. In an additional aspect, this multi-layer flow health visibility makes it possible for a network provider or network device to provide directives to the system to prioritize certain flows or L7 traffic. In some examples, this prioritization functionality may be categorized by Network-Based Application Recognition (NBAR) applications.

Additionally, access network 100 may comprise an Ethernet network, an optical network, such as a passive optical network (PON) or an active optical network (AON), Gigabit-capable PON (GPON), or any other communication access network, optical or otherwise, known by one of ordinary skill in the art. Furthermore, access network 100 may provide communication services to the one or more user terminals 120 via one of a bevy of network topologies, including, but not limited to tree, ring, star, mesh, bus, fiber to the curb (FTTC), fiber to the neighborhood (FTTN), fiber to the premises (FTTP), fiber to the home (FTTH), fiber to the X (FTTX) or any other network topology, architecture, or sub-architecture known to one of ordinary skill in the art.

Additionally, access network 100 and/or core network 102 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. In addition, access network 100 may comprise a virtual large area network (VLAN).

As those skilled in the art will readily appreciate, various aspects described throughout this disclosure may be extended to other telecommunication systems, network architectures, and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the access network 100 and/or core network 102 (e.g. user terminals 120) may be coupled to the networks via one or more wired or wireless connections, as may any network devices of access network 100.

Moreover, the one or more user terminals 120 may each include a personal computer, such as a desktop computer, laptop computer, tablet, or other computing device, which may include a processing device or one or more processing modules for executing one or more instructions stored on a computer-readable medium. Additionally or alternatively, the one or more user terminals may include one or more set-top boxes or set-top units that may be configured to process communication signals or packets associated with one or more packet streams. Furthermore, the one or more user terminals 120 may include one or more mobile devices, which may be known to those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Furthermore, one or more of nodes 106 of FIG. 1 may include one or more of any type of network device, such as an optical network unit (ONU), splitter, access point, a macro cell, including a base station (BS), node B, eNodeB (eNB), a relay, a peer-to-peer device, an authentication, authorization and accounting (AAA) server, a mobile switching center (MSC), a radio network controller (RNC), or a low-power access point, such as a picocell, femtocell, microcell, a switching device, routing device, or any other network device of an access network known to one of ordinary skill in the art. Additionally, for purposes of the present disclosure, the term "upstream" may designate a direction of communication or network architecture originating at a point closer to user terminals 120 and moving toward core network 102. Likewise, for purposes of the present disclosure, the term "downstream" may designate a direction of communication or network architecture originating at a point closer to core network 102 moving toward user terminals 120. These flow directions are indicated by the up and downstream directional pointers of packet flow 108, which may comprise one or both of upstream or downstream packet flows. Furthermore, as indicated in FIG. 1, each upstream network device may communicate with a plurality of downstream network devices, for example, such that a tree network architecture is achieved, though any form of network topology (e.g. ring, mesh, etc.) is within the scope of the present disclosure. In other words, router 104 may communicate with a plurality of downstream nodes 106, each of the plurality of nodes 106 may communicate with a plurality of downstream user terminals 120 or further nodes 106.

Furthermore, in some examples, flow control manager 116 may be configured to receive network topology information and a plurality of communication monitoring messages to one or more packet flows associated with one or more user terminals 120 or applications running thereon. Upon receiving this information, the flow control manager 116 may analyze the information to determine the relative health of packet flows traversing the network and may display the relative health of the packet flows to a user or network provider.

In one non-limiting example, a downstream packet flow 108*b* carrying information from the core network 102 to a user terminal 120 may travel through node 106*b*. In an aspect, the downstream packet flow 124 may carry downstream data related to a video streaming service. The flow control manager 116 may obtain an indication of network congestion at a node 106*b* along the downstream path of the video streaming downstream packet flow 108*b*. In some instances, this may disrupt the integrity of the video streaming user experience at user terminal 120. Therefore, in an attempt to remedy the network congestion condition, the flow control manager 116, router 104, or other device or component may reroute downstream packet flow 108*b* to a different packet flow route, increase bandwidth associated with downstream packet flow 108*b*, or drop lower priority traffic as to avoid the one or more problem nodes of nodes 106*b* causing the congestion or at which congestion exists.

Figure 2:
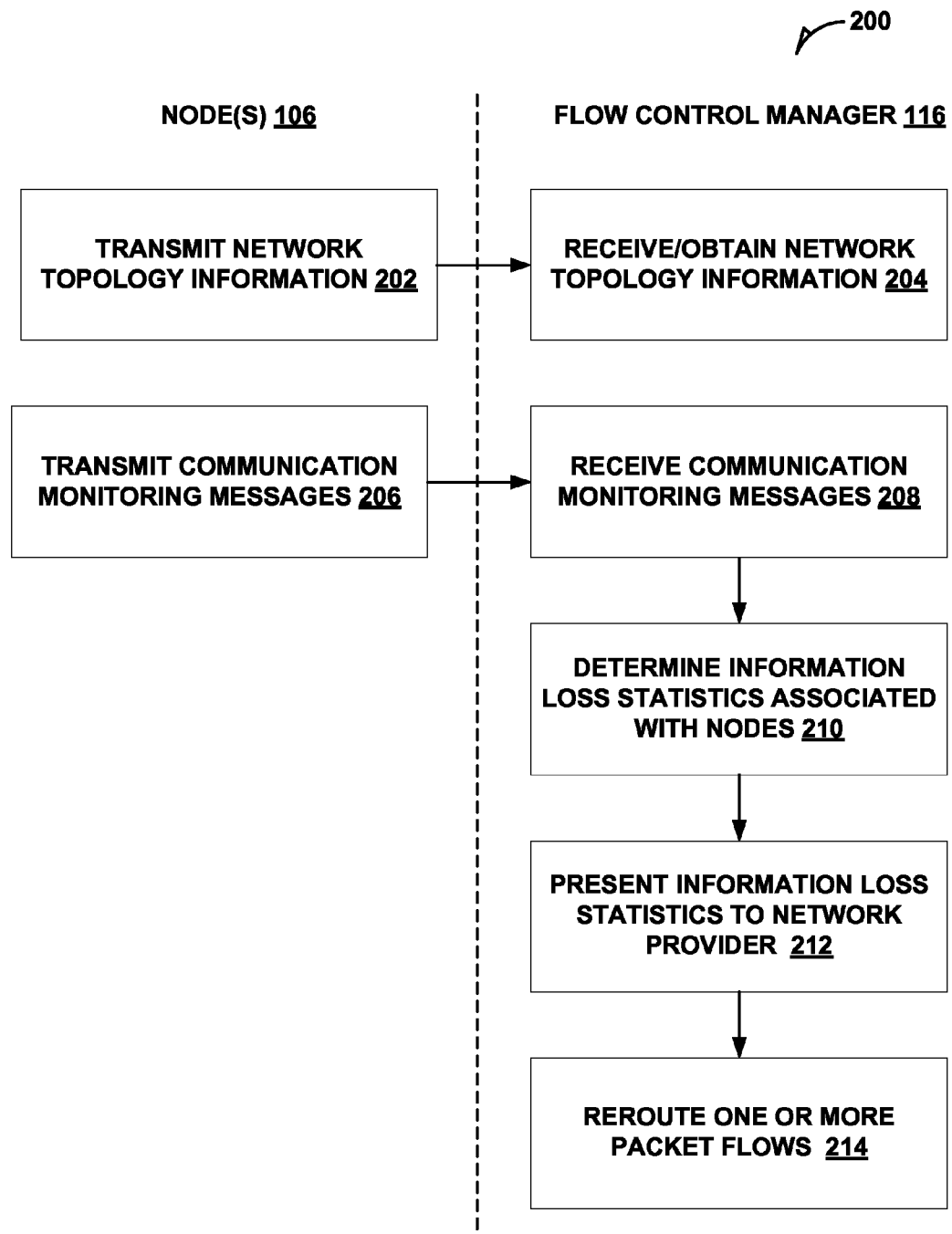
FIG. 2 is a flow diagram illustrating an example method and message flow for improved network flow control, according to various techniques of the present disclosure.

FIG. 2 is a flowchart illustrating an example method 200 for improved packet flow management in access networks according to examples of the present disclosure. FIG. 2 provides the example methodology as performed by a packet flow manager (e.g. packet flow manager 116 of FIG. 1) and one or more nodes (e.g. nodes 106 of FIG. 1) in an access network.

In an aspect of methodology 200, node 106 may transmit network topology information to flow control manager 116 at block 202. This network topology information may include information regarding the orientation of the node 106 in relation to other nodes 106, user terminals 120, or one or more other network devices. For example, the network topology information may identify the other network devices or user terminals to which node 106 is communicatively coupled, the hardware profile, bandwidth information, service information, or other characteristics of the node 106. In addition, at block 204, flow control manager 116 may receive or otherwise obtain the network topology information 204.

In addition, at block 206, the one or more nodes may transmit one or more communication monitoring messages 206 to flow control manager 116. The communication monitoring messages may include layer-, flow-, and/or application-specific packet flow information, such as, but not limited to, a number of packets sent or received, number or percentage of packets dropped, queued, retransmitted, hypertext transfer protocol (HTTP) uniform resource locator (URL) information, or any other communication-related statistics or information.

For example, the communication monitoring information may include associated layer information for layers 1 to layer 7, including physical layer information (L1), data link layer information (L2), network layer information (L3), transport layer information (L4), session layer information (L5), presentation layer information (L6), and/or application layer information (L7). As stated above, these communication monitoring messages may include layer-specific packet flow information corresponding to packets of one or more packet flows traversing the node(s) 106 and/or router 104 of FIG. 1. For example, L1 packet flow information included in the communication monitoring messages may include link information, one or more event alarms, and/or one or more port statistics associated with a node 106 or a particular network interface.

In some examples, L2 packet flow information included in the communication monitoring messages 122 may include Remote Network Monitoring (RMON) statistics associated with a node 106. Furthermore, the L2 packet information may include Switched Network Monitoring (SMON) statistics. Additionally, L3 and/or L7 information may include information associated with one or more traffic analyzer reports (e.g. Netflow reports) corresponding to Internet Protocol (IP) or application traffic of one or more packet flows, Deep Packet Inspection information, logs, or external applications (e.g. content delivery network or video platform information). Moreover, the communication monitoring messages 206 may include expected packet information, such as the number of packets or data units expected to traverse the node (which may determined at one or more network ingress points, such as a router), and actual packet information, such as the actual amount of packets or data units received or transmitted at the node 106.

Furthermore, at block 208, the flow control manager 116 may receive the one or more communication monitoring messages from one or more nodes 106. In some examples, communication monitoring messages may be received from a plurality of nodes, which may include communication information corresponding to a plurality of communication layers. For example, flow control manager 116 may receive a first communication monitoring message from a first network switch that includes SMON statistical information (L2 information) associated with a first and second flow. In addition, flow control manager 116 may receive a second communication monitoring message from a second network switch that includes traffic analyzer (Netflow, Deep-Packet Inspection, L3 and/or L7) information associated with the first and second flow.

Based on the received communication monitoring messages, the flow control manager 116 may determine information loss statistics associated with one or more nodes corresponding to one or more packet flows at block 210. For example, to determine the information loss statistics, flow control manager 116 may analyze the information associated with a particular node, communication layer, interface, application, or packet flow received via a plurality of communication monitoring messages and may determine a number or percentage of packets of a packet flow that have been altered (e.g. dropped, suspended, queued, retransmitted, or otherwise delayed) at the particular node, communication layer, interface, or the like. In some examples, this may include comparing actual packets received or transmitted to expected packets (received or transmitted) at a layer, interface, or node to determine whether packets have been dropped or otherwise altered.

Furthermore, at block 212, the flow control manager 116 may present the information loss statistics associated with the nodes to a user or network provider. For example, the flow control manager 116 may include executable instructions stored on a computer-readable medium (e.g. a storage component) for displaying the information loss statistics and may be communicatively coupled to a display device. This display device may present the information loss statistics to the user of network provider on a per-layer, per-interface, per-device, and/or per-flow (e.g. service flor or application flow) basis. For example, the flow control manager 116 may be configured to display the information loss statistics as a color associated with each flow of the network. Green may indicate good flow health, yellow may indicate average flow health, and red may indicate poor flow health. For purposes of the present invention, the term "health" in reference to a network or packet flow may refer to a certain percentage of packets of the packet flow or network being altered (e.g. dropped, queued, retransmitted, or otherwise interrupted). This percentage may differ according to application type. In a non-limiting example, a "green" indication may indicate that less than five percent of packets are altered, a "yellow" indication may indicate that 5 percent to less than 25 percent of packets are altered, and a "red" indication may indicate that 25 percent or more of packets are altered. Alternatively or additionally, the flow control manager 116 may present the information loss statistics as a percentage of packets altered (or not altered) at a particular interface, node, or other network device.

Furthermore, at block 214, the flow control manager 116 may be configured to reroute one or more packet flows based on the information loss statistics. In an aspect, this rerouting may be executed by one or more other network devices, such as a router, switch, or other node based on a command transmitted by the flow control manager 116. In other examples, the flow control manager 116 may play no part in the rerouting; rather, the rerouting may be executed by the router, switch, or other node based on direct control signal communication between a network provider or user device and the router, switch, or other node based on the presented information loss statistics.

In this manner and in contrast to existing techniques, two or more nodes may transmit network topology information and communication monitoring messages associated with a plurality of communication layers to a flow control manager, which may be utilized to perform packet flow control at disparate network locations. As such, packet flow control may be optimized by analyzing myriad packet flow statistics corresponding to multiple disparate network devices, flows, or interfaces throughout an access network.

Figure 3:
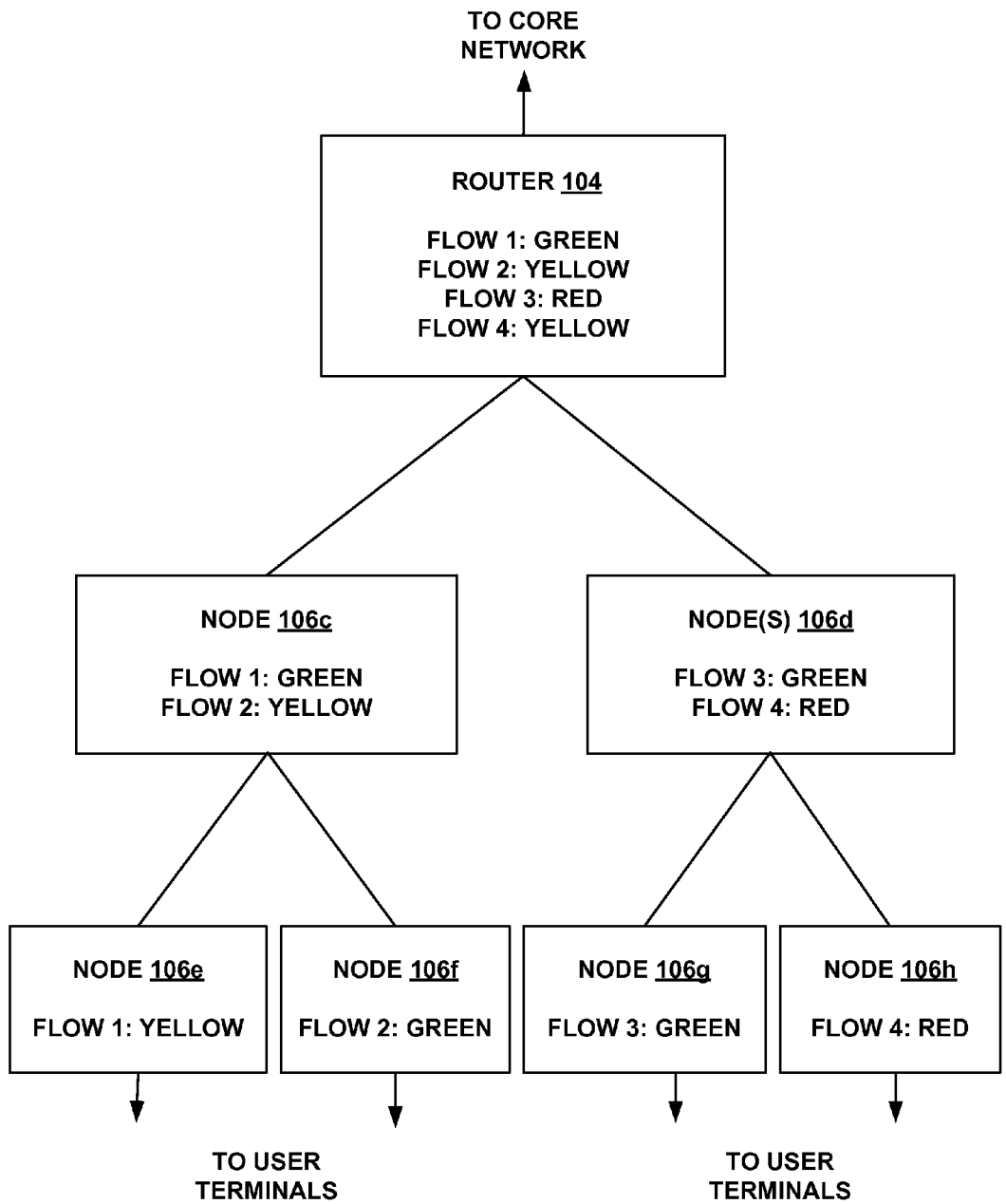
FIG. 3 is a block diagram illustrating an example flow control manager according to the present disclosure.

FIG. 3 is a diagram illustrating an example program interface displaying network health statistics to a user or network provider according to the present disclosure. FIG. 3 presents a representation of an access network (e.g. access network 100 of FIG. 1), including a router 104 and nodes 106c, 106d, 106e, 106f, 106g, and 106h (collectively, nodes 106) of the access network. Each of the router and nodes include at least one associated packet flows ("flows"), which include flows 1 to 4, each of which may correspond to an application or program executed by a user terminal and requiring communication with a core network through the access network.

As shown in FIG. 3, each of the flows may be identified and color coded to indicate the health of each flow at each node 106 and/or router. For example, moving downstream from the core network to the user terminals, flow 1 moves from a relatively healthy communication flow at the router 104 and the next-level node 106c (indicated by a "green" indication) to a relatively intermediate or average health at the lower node 106e. This may indicate that the health of flow 1 is degraded as it moves downstream. Based on this display of information loss statistics, the user or network provider may attempt to reroute one or more of the flows in an attempt to avoid a node that indicates relatively poor flow health for one or more of the flows.

Figure 4:
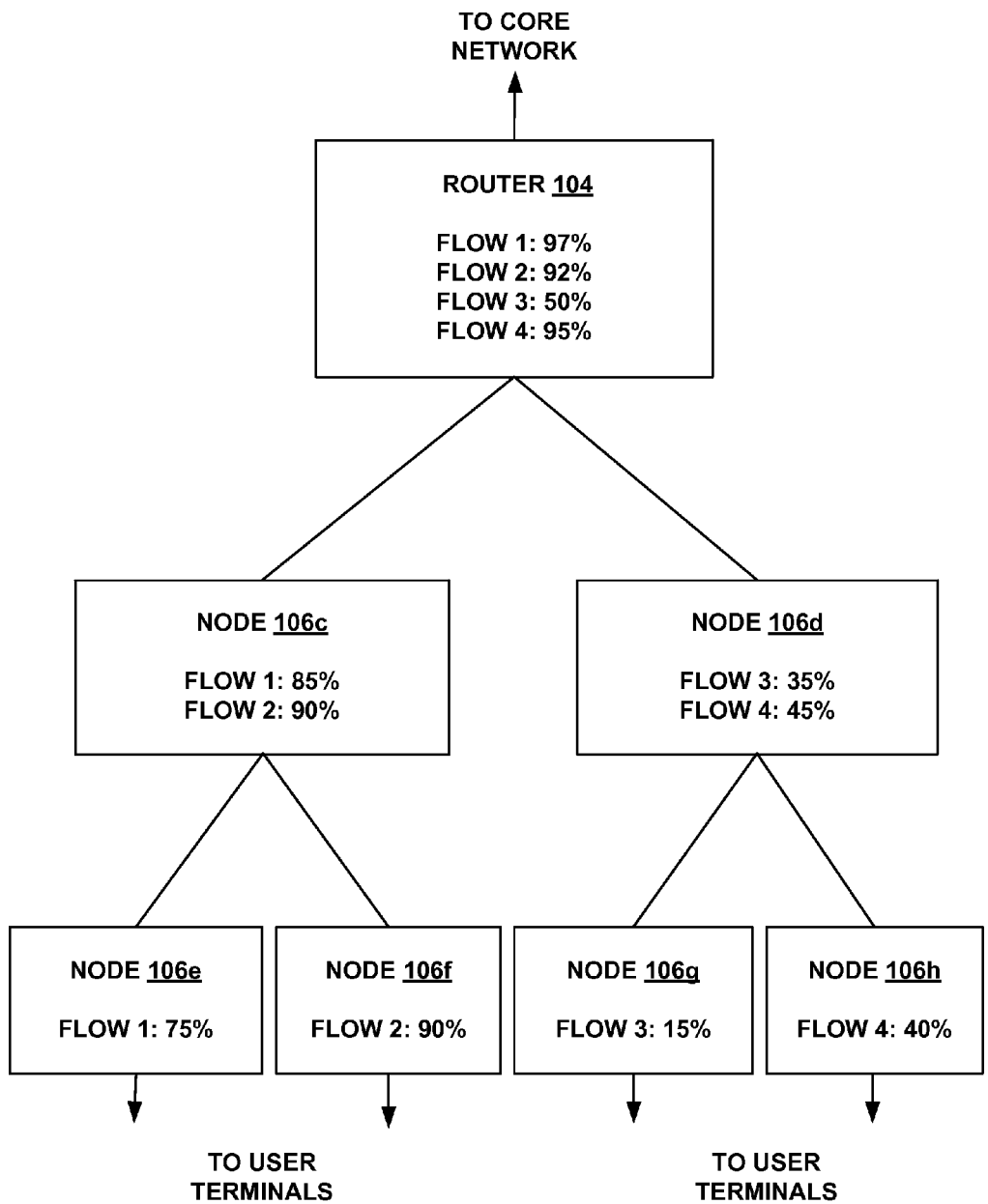
FIG. 4 is an illustration of a method of displaying information loss statistics by color.

FIG. 4 illustrates an alternative information loss statistic display method based on displayed percentages of packets unaltered (or altered) at each of nodes 106c, 106d, 106e, 106f, 106g, and 106h (collectively, nodes 106) and/or router 104, or across the access network in total. FIG. 4 illustrates the downstream health of packet flows 1 to 4 by displaying the percentage of packets that successfully traverse router 104 and nodes 106. As such, a user or network provider may identify the network location where packet flows are degraded.

For example, moving downstream from the core network to the user terminals, flow 4 moves from a relatively healthy communication flow at the router (95% of packets successfully traversing the router) to a poor health at the intermediate node 106d and lower node 106h (45% and 40%, respectively). This may indicate that the health of flow 4 is degraded as it moves downstream, especially at intermediate node 106d, where the percentage of successfully traversing packets drops to 45% of the expected packets. Based on this display of information loss statistics, the user or network provider may attempt to reroute one or more of the flows in an attempt to avoid a node (e.g. the problem intermediate node) that indicates relatively poor flow health for one or more of the flows.

Figure 5:
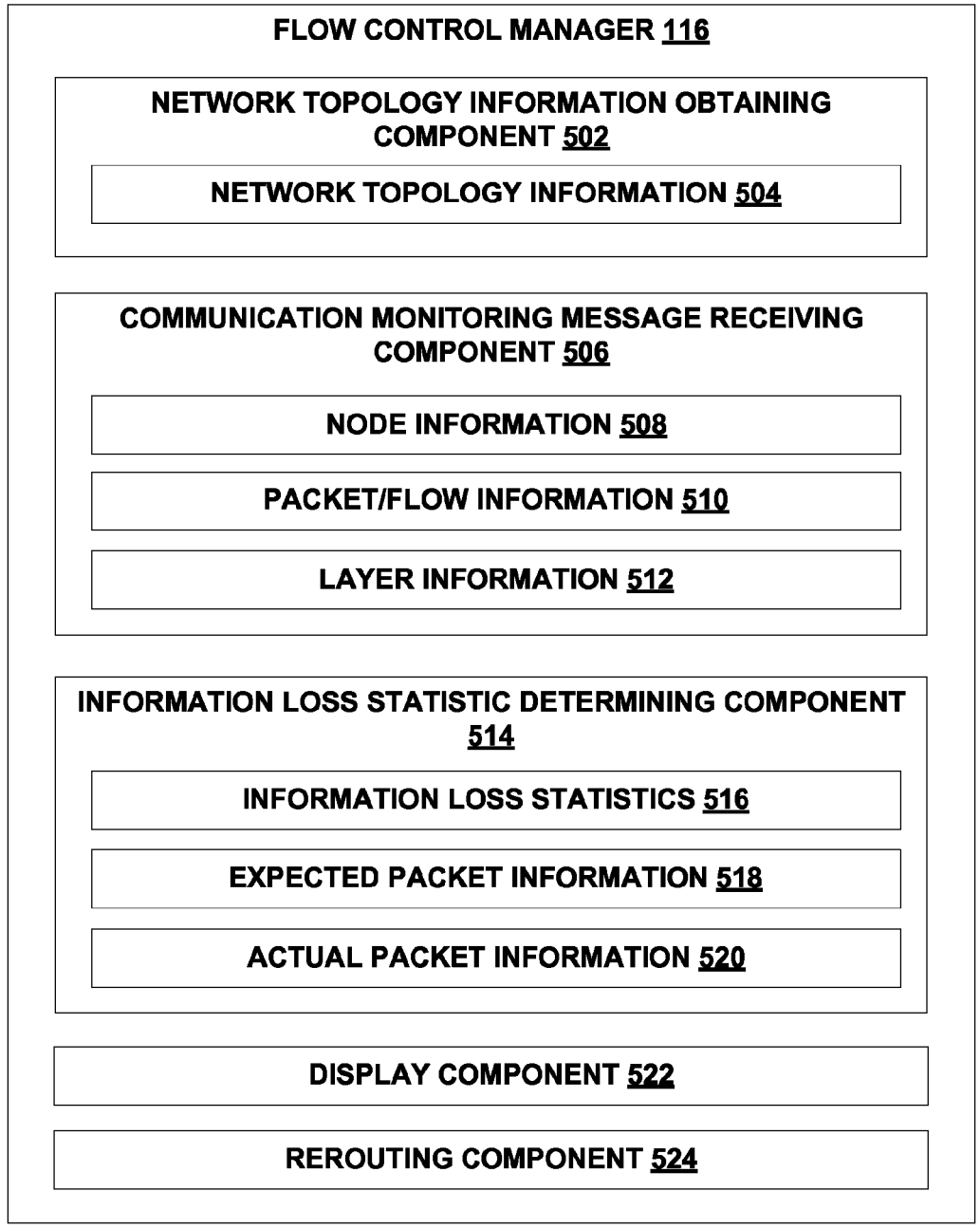
FIG. 5 is an illustration of a method of displaying information loss statistics by percentage.

FIG. 5 is a block diagram illustrating an example flow control manager 116 of access network 100 of FIG. 1. In an aspect, flow control manager 116 may include one or more sub-components that are configured to perform one or more acts associated with methodologies described herein (e.g. methodology 200 of FIG. 2). In some examples, flow control manager 116 may include a network topology information obtaining component 502, which may be configured to obtain network topology information 504, for example, from one or more nodes of an access network. In an aspect, the network topology information 504 may include information concerning the topology, arrangement, interconnection mapping, or the like, of the access network.

In addition, flow control manager 116 may include a communication monitoring message receiving component 506, which may be configured to receive communication monitoring messages from one or more network devices (e.g. routers, nodes, switches, etc.). In some examples, the communication monitoring messages may include node information 508 corresponding to the node from which each of the communication monitoring messages originated, packet and/or flow information 510 corresponding to packet flows traversing the particular nodes (e.g. packet, application, and/or user terminal identifying information), and layer information 512 identifying the communication layer to which the communication monitoring message pertains. In addition, communication monitoring messages may include prioritization information that may indicate that certain types of traffic or L7 flows should be prioritized over others.

Furthermore, flow control manager 116 may include an information loss statistic determining component 514, which may be configured to determine information loss statistics 516 associated with one or more nodes, routers, interfaces, or other network devices of an access network. In an aspect, information loss statistic determining component 514 may determine the loss statistics based on the communication monitoring messages received by communication monitoring message receiving component 506. In some examples, information loss statistic determining component 514 may determine the information loss statistics 516 based on comparing expected packet information 518 to actual packet information 520, for example, to determine a percentage of packets that have been altered by one or more nodes, routers, switches, or other network devices.

In addition, flow control manager 116 may include a display component, which may be configured to display the information loss statistics 516 to a user or network provider. Furthermore, flow control manager 116 may include a rerouting component 524, which may be configured to reroute one or more packets of one or more packet flows associated with the access network.

Figure 6:
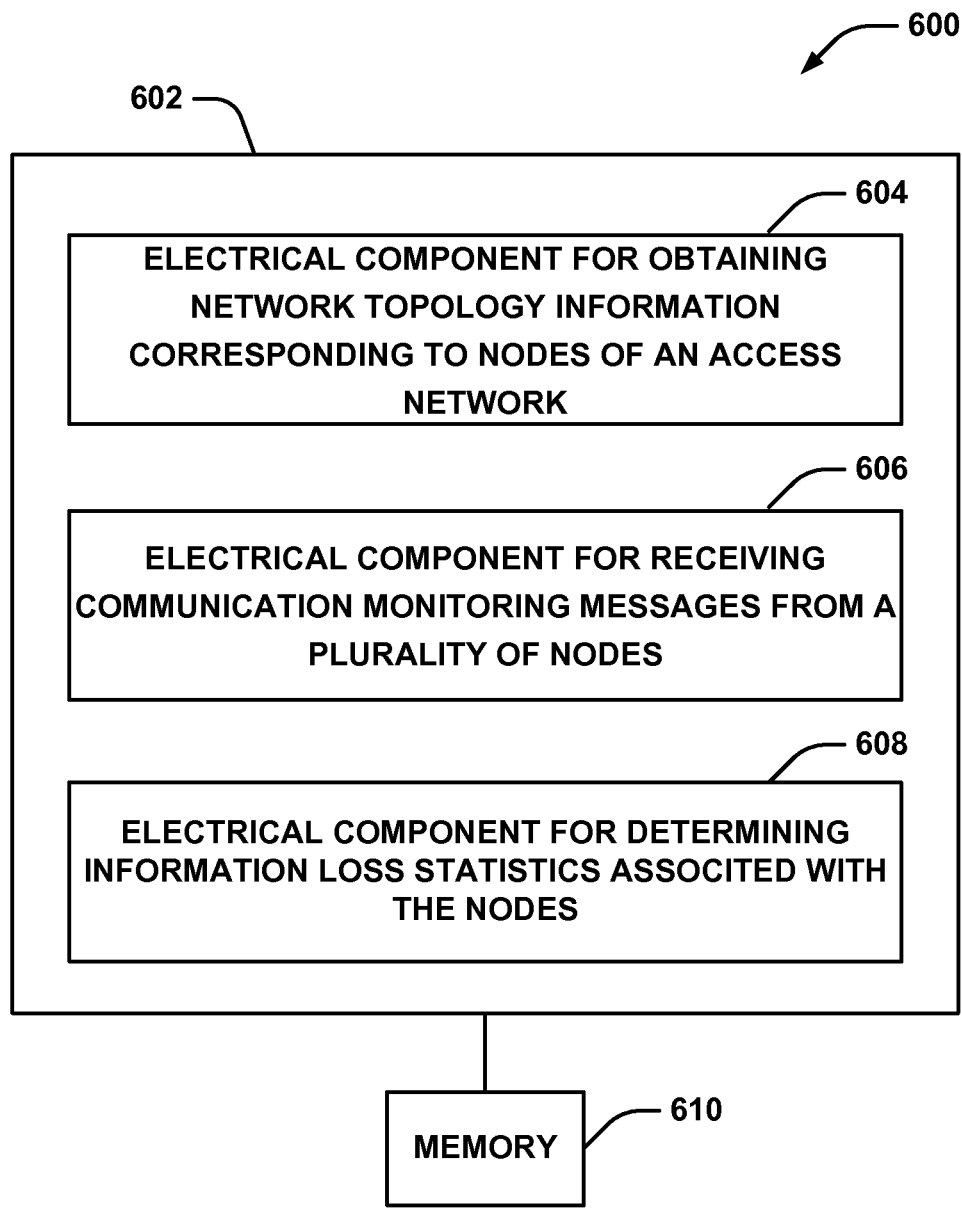
FIG. 6 is a block diagram illustrating a logical grouping of electrical components according to aspects of the present disclosure.

Referring to FIG. 6, a block diagram illustrating an example system 600 is displayed for improved packet flow control on an access network. For example, system 600 can reside at least partially within one or more computing or processing devices, which may include, in a non-limiting aspect, any network device described herein, including, but not limited to, flow control manager 116 of FIG. 1.

It is to be appreciated that system 600 is represented as including functional blocks, which can be functional blocks that represent processes implemented by a processor, software, or combination thereof (e.g., firmware). System 600 includes a logical grouping 602 of electrical components that can act in conjunction. For instance, logical grouping 602 can include an electrical component 604 for obtaining network topology information corresponding to node of an access network. In an aspect, electrical component 604 may comprise network topology information obtaining component 502 (FIG. 5). In addition, logical grouping 602 can include an electrical component 606 for receiving communication monitoring messages from a plurality of nodes. In an aspect, electrical component 606 may comprise communication monitoring message receiving component 506 (FIG. 5). In addition, logical grouping 602 can include an electrical component 608 for determining information loss statistics associated with the nodes. In an aspect, electrical component 608 may comprise information loss statistic determining component 514 (FIG. 5).

Additionally, system 600 can include a memory 610 that retains instructions for executing processes associated with the electrical components 604, 606, and 608, stores data used or obtained by the electrical components 604, 606, and 608, etc. While shown as being external to memory 610, it is to be understood that one or more of the electrical components 604, 606, and 608 can exist within memory 610. In one example, electrical components 604, 606, and 608 can comprise at least one processor, or each electrical component 604, 606, and 608 can be a corresponding module of at least one processor. Moreover, in an additional or alternative example, electrical components 604, 606, and 608 can be a computer program product including a computer readable medium, where each electrical component 604, 606, and 608 can be corresponding code.

Figure 7:
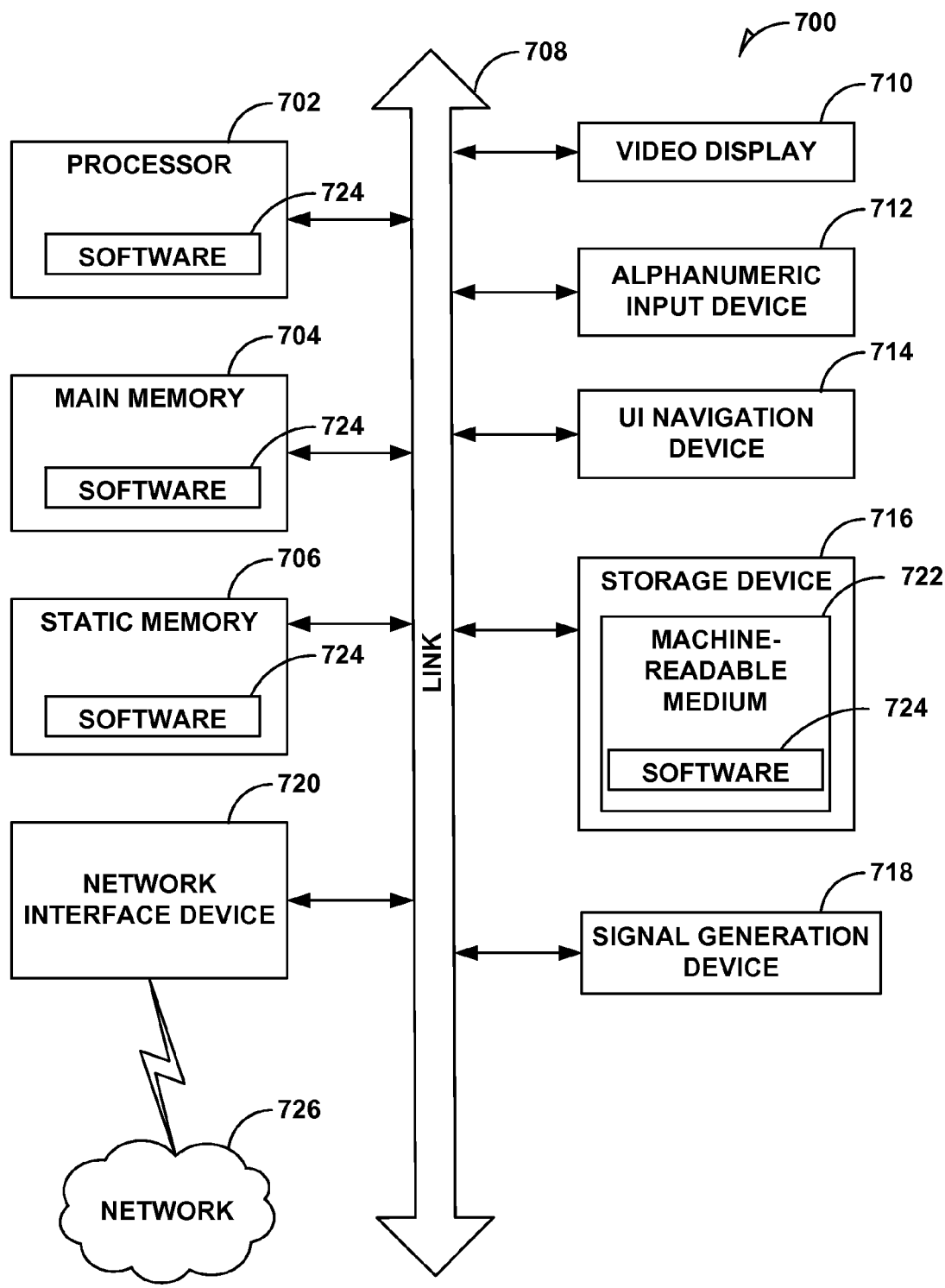
FIG. 7 is a block diagram illustrating an example machine in the example form of a computer system, within which a set or sequence of instructions for causing the machine to perform any one of the methodologies discussed herein may be executed, according to various techniques of the present disclosure.

FIG. 7 is a block diagram illustrating a machine in the example form of a computer system 700, which may represent one or more of the devices introduced above, including, but not limited to, flow control manager 116, or any of the access network devices of FIG. 1. Within the example computer system 700 are a set or sequence of instructions for causing the machine to perform any one of the methodologies discussed herein may be executed, according to an example embodiment. In alternative embodiments, the machine operates as a standalone device or may be connected (e.g. networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes at least one processor 702 (e.g. a central processing unit (CPU), a graphics processing unit (GPU) or both, processor cores, computer nodes, etc.), a main memory 704 and a static memory 706, which communicate with each other via a link 708 (e.g. bus). The computer system 700 may further include a video display unit 710, an alphanumeric input device 712 (e.g. a keyboard), and a user interface (UI) navigation device 714 (e.g. a mouse). In one embodiment, the video display unit 710, input device 712 and UI navigation device 714 are incorporated into a touch screen display. The computer system 700 may additionally include a storage device 716 (e.g. a drive unit), a signal generation device 718 (e.g. a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g. software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g. a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or corresponding to such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g. Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g. HTTP). Examples of communication networks include a local area network (LAN), a wide area network (WAN), the Internet, mobile telephone networks, Plain Old Telephone (POTS) networks, and wireless data networks (e.g. Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of modules, modules, or mechanisms. Modules are tangible entities capable of performing specified operations and may be configured or arranged in a certain manner. In an example, circuits may be arranged (e.g. internally or with respect to external entities such as other circuits) in a specified manner as a module. In an example, the whole or part of one or more computer systems (e.g. a standalone, client or server computer system) or one or more hardware processors may be configured by firmware or software (e.g. instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the terms "component," "components," "module" and "modules" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which modules are temporarily configured, one instantiation of a module may not exist simultaneously with another instantiation of the same or different module. For example, when the modules comprise a general-purpose hardware processor configured using software, the general-purpose hardware processor may be configured as respective different modules at different times. Accordingly, software may configure a hardware processor, for example, to constitute a particular module at one instance of time and to constitute a different module at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

What is claimed is:

1. A method for network monitoring, comprising:

obtaining, from a plurality of nodes of a network, network topology information corresponding to the plurality of nodes of the network, wherein the network topology information includes the orientation of each node of the plurality of nodes in relation to each other node of the plurality of nodes;

receiving communication monitoring messages from at least two nodes of the plurality of nodes, wherein the communication monitoring messages include communication information corresponding to a plurality of communication layers;

determining information loss statistics associated with the plurality of nodes and a packet flow corresponding with the plurality of nodes based on the communication monitoring messages and the network topology information;

determining an application corresponding with the packet flow from the communication monitoring messages;

determining a priority for the identified application from the communication monitoring messages;

calculating a relative health value for the packet flow at a second node of the plurality of nodes using a percentage of packets that have been altered while traversing the second node, wherein the percentage of packets that have been altered while traversing the second node are used to determine the information loss statistics corresponding with the second node; and configuring a first node of the plurality of nodes responsible for transmitting the packet flow to transmit the packet flow to a third node of the plurality of nodes rather than the second node of the plurality of nodes using the priority and the relative health value of the packet flow at the second node of the plurality of nodes.

2. The method of claim 1, wherein the plurality of communication layers includes layer 1 and the communication information comprises link information.

3. The method of claim 2, wherein the link information comprises one or more of an alarm, burstable bandwidth information, a Peak Information Rate (PIR), a Committed Information Rate (CIR), Committed Data Rate (CDR), or an Excess Information Rate (EIR).

4. The method of claim 1, wherein the plurality of communication layers includes layer 2 and the communication information comprises one or both of Switch Monitoring (SMON) information or Remote Network Monitoring (RMON) information.

5. The method of claim 1, wherein the plurality of communication layers includes layer 3 and the communication information comprises Internet Protocol (IP) information.

6. The method of claim 1, wherein the plurality of communication layers includes layer 7 and the communication information comprises application-specific information.

7. The method of claim 1, wherein the communication information is associated with one or more packet flows.

8. The method of claim 1, wherein the communication information comprises dropped packet information.

9. The method of claim 1, wherein determining information loss statistics comprises:
obtaining expected packet information; and
comparing the expected packet information to actual packet information, wherein the actual packet information is included in the communication information messages.

10. The method of claim 1, further comprising displaying the information loss statistics.

11. An apparatus for managing packet flow in a network, comprising:
at least one processor;
at least one non-transitory machine readable medium with instructions stored thereon, wherein when the instructions are executed by the at least one processor the at least one processor is configured to:
obtain, from a plurality of node of a network, network topology information corresponding to the plurality of nodes of the network, wherein the network topology information includes the orientation of each node of the plurality of nodes in relation to each other node of the plurality of nodes;
receive communication monitoring messages from two or more nodes of the plurality of nodes, wherein the communication monitoring messages include communication information corresponding to a plurality of communication layers;
determine information loss statistics associated with the plurality of nodes and a packet flow corresponding with the plurality of nodes based on the communication monitoring messages and the network topology information;
determine an application corresponding with the packet flow from the communication monitoring messages;
determine a priority for the identified application from the communication monitoring messages;
calculate a relative health value for the packet flow at a second node of the plurality of nodes using a percentage of packets that have been altered while traversing the second node, wherein the percentage of packets that have been altered while traversing the second node are used to determine the information loss statistics corresponding with the second node; and
configure a first node of the plurality of nodes responsible for transmitting the packet flow to transmit the packet flow to a third node of the plurality of nodes rather than the second node of the plurality of nodes using the priority and the relative health value of the packet flow at the second node of the plurality of nodes.

12. The apparatus of claim 11, wherein the instructions to determine information loss statistics further configure the processor to:
obtain expected packet information; and
compare the expected packet information to actual packet information, wherein the actual packet information is included in the communication information messages.

13. The apparatus of claim 11, wherein the instructions further configure the processor to display the information loss statistics.

14. The apparatus of claim 11, wherein the communication information is associated with one or more packet flows.

15. The apparatus of claim 11, wherein the communication information comprises dropped packet information.

16. At least one non-transitory machine readable medium comprising a plurality of instructions that in response to being executed on a computing device, cause the computing device to perform the acts of:
obtaining, from a plurality of nodes of a network, network topology information corresponding the plurality of nodes of the network, wherein the network topology information includes the orientation of each node of the plurality of nodes in relation to each other node of the plurality of nodes;
receiving communication monitoring messages from two or more nodes of the plurality of nodes, wherein the communication monitoring messages include communication information corresponding to a plurality of communication layers;
determining information loss statistics associated with the plurality of nodes and a packet flow corresponding with the plurality of nodes based on the communication monitoring messages and the network topology information;
determining an application corresponding with the packet flow from the communication monitoring messages;
determining a priority for the identified application from the communication monitoring messages;
calculating a relative health value for the packet flow at a second node of the plurality of nodes using a percentage of packets that have been altered while traversing the second node, wherein the percentage of packets that have been altered while traversing the second node are used to determine the information loss statistics corresponding with the second node; and
configuring a first node of the plurality of nodes responsible for transmitting the packet flow to transmit the packet flow to a third node of the plurality of nodes rather than the second node of the plurality of nodes using the priority and the relative health value of the packet flow at the second node of the plurality of nodes.

17. The at least one machine readable medium of claim 16, comprising further instructions that in response to being executed on the computing device, cause the computing device to perform the acts of:
obtaining expected packet information; and
comparing the expected packet information to actual packet information, wherein the actual packet information is included in the communication information messages.

18. The at least one machine readable medium of claim 16, comprising further instructions that in response to being executed on the computing device, cause the computing device to perform the acts of displaying the information loss statistics.

19. The at least one machine readable medium of claim 16, wherein the communication information is associated with one or more packet flows.

20. The at least one machine readable medium of claim 16, wherein the communication information comprises dropped packet information.

\* \* \* \* \*